United States Patent
Liang

(10) Patent No.: US 11,227,612 B2
(45) Date of Patent: Jan. 18, 2022

(54) AUDIO FRAME LOSS AND RECOVERY WITH REDUNDANT FRAMES

(71) Applicant: Tencent Technology (Shenzhen) Company Limited, Shenzhen (CN)

(72) Inventor: Junbin Liang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 116 days.

(21) Appl. No.: 16/286,928

(22) Filed: Feb. 27, 2019

(65) Prior Publication Data

US 2019/0198027 A1 Jun. 27, 2019

Related U.S. Application Data

(63) Continuation of application No. PCT/CN2017/106640, filed on Oct. 18, 2017.

(30) Foreign Application Priority Data

Oct. 31, 2016 (CN) .......................... 201610931391.8

(51) Int. Cl.
*G10L 19/005* (2013.01)
*G10L 19/07* (2013.01)
(Continued)

(52) U.S. Cl.
CPC .............. *G10L 19/005* (2013.01); *H04L 1/00* (2013.01); *H04L 65/604* (2013.01);
(Continued)

(58) Field of Classification Search
CPC ..... G10L 19/005; G10L 19/07; G10L 19/167; G10L 2019/0012; G10L 21/003; G10L 25/03; G10L 25/90
(Continued)

(56) References Cited

U.S. PATENT DOCUMENTS 5,917,835 A * 6/1999 Barrett ................. G10L 19/005
369/93
6,597,961 B1 * 7/2003 Cooke ................. G10L 19/005
700/94
(Continued)

FOREIGN PATENT DOCUMENTS

| CN | 102810314 A | 12/2012 |
| CN | 104917671 A | 9/2015 |
| CN | 105741843 A | 7/2016 |

OTHER PUBLICATIONS

Search Report received for PCT Application No. PCT/CN2017/106640 dated Nov. 1, 2018 (Chinese language only) (12 pp.).

*Primary Examiner* — Martin Lerner
(74) *Attorney, Agent, or Firm* — Crowell & Moring LLP

(57) ABSTRACT

An audio frame loss recovery method and apparatus are disclosed. In one implementation, data from some but not all audio frames is included in a redundant frame. The audio frames whose data is not included in the redundant frame may include multiple audio frames but may not include more than two consecutive audio frames. Because not all audio frames are used in the redundant frame, the amount of information needed to be transmitted in the redundant frame is reduced. A lost audio frame during transmission may be recovered from either the redundant frame when the redundant frame incudes data of the lost frame, or from at least one neighboring frame of the lost frame derived from either the redundant frame or the successfully transmitted audio frames when the redundant frame does not include data of the lost frame.

18 Claims, 5 Drawing Sheets

(51) Int. Cl.
  *H04L 29/06* (2006.01)
  *H04L 1/00* (2006.01)
  *G10L 19/00* (2013.01)
  *G10L 19/12* (2013.01)
(52) U.S. Cl.
  CPC .......... H04L 65/607 (2013.01); H04L 65/80 (2013.01); *G10L 19/12* (2013.01); *G10L 2019/0001* (2013.01)
(58) Field of Classification Search
  USPC ........ 704/205, 206, 207, 219, 221, 500, 501
  See application file for complete search history.

(56) References Cited

U.S. PATENT DOCUMENTS

| | | | | |
|---|---|---|---|---|
| 6,775,654 | B1* | 8/2004 | Yokoyama | G10L 19/005 704/226 |
| 6,810,377 | B1* | 10/2004 | Ho | G10L 19/005 704/208 |
| 7,146,309 | B1* | 12/2006 | Benyassine | G10L 19/08 704/201 |
| 7,529,673 | B2* | 5/2009 | Makinen | G10L 19/005 704/265 |
| 7,930,176 | B2* | 4/2011 | Chen | G10L 19/005 704/228 |
| 10,614,816 | B2* | 4/2020 | Atti | G10L 19/002 |
| 2002/0123887 | A1* | 9/2002 | Unno | G10L 19/005 704/220 |
| 2005/0043959 | A1* | 2/2005 | Stemerdink | G10L 19/005 704/500 |
| 2005/0049853 | A1* | 3/2005 | Lee | G10L 19/005 704/201 |
| 2005/0154584 | A1* | 7/2005 | Jelinek | G10L 19/005 704/219 |
| 2006/0178872 | A1* | 8/2006 | Sung | G10L 19/07 704/205 |
| 2009/0076808 | A1* | 3/2009 | Xu | G10L 19/005 704/207 |
| 2009/0319264 | A1* | 12/2009 | Yoshida | G10L 19/005 704/230 |
| 2010/0049510 | A1* | 2/2010 | Zhan | G10L 25/90 704/219 |
| 2010/0070270 | A1* | 3/2010 | Gao | G10L 19/26 704/207 |
| 2010/0312553 | A1* | 12/2010 | Fang | G10L 19/005 704/226 |
| 2011/0125505 | A1* | 5/2011 | Vaillancourt | G10L 19/005 704/500 |
| 2011/0196673 | A1* | 8/2011 | Sharma | G10L 19/005 704/207 |
| 2011/0208517 | A1* | 8/2011 | Zopf | G10L 21/04 704/211 |
| 2012/0010882 | A1* | 1/2012 | Thyssen | G10L 19/005 704/226 |
| 2012/0102538 | A1* | 4/2012 | Bansal | G10L 19/16 704/500 |
| 2012/0232889 | A1* | 9/2012 | Kapilow | G10L 21/003 704/224 |
| 2014/0229170 | A1* | 8/2014 | Atti | G10L 21/0264 704/225 |
| 2015/0106106 | A1 | 4/2015 | Atti et al. | |
| 2015/0340046 | A1* | 11/2015 | Chen | G10L 19/032 704/500 |
| 2016/0148618 | A1* | 5/2016 | Huang | G10L 19/167 381/2 |
| 2016/0196827 | A1* | 7/2016 | Greer | G10L 19/24 704/229 |
| 2016/0366274 | A1* | 12/2016 | Yang | G10L 25/69 |
| 2016/0372122 | A1* | 12/2016 | Zhang | G10L 19/06 |

* cited by examiner

AUDIO FRAME LOSS AND RECOVERY WITH REDUNDANT FRAMES

RELATED DISCLOSURE

This application claims priority to PCT Application No. PCT/CN2017/106640, entitled "INFORMATION CODED FRAME LOSS RECOVERY METHOD AND APPARATUS" filed with the Chinese Patent Office on Oct. 18, 2017, which claims priority to Chinese Patent Disclosure No. 201610931391.8, entitled "INFORMATION CODED FRAME LOSS RECOVERY METHOD AND APPARATUS" filed with the Chinese Patent Office on Oct. 31, 2016, which is incorporated herein by reference in their entireties.

FIELD OF THE TECHNOLOGY

This disclosure relates to the field of information loss recovery in communication systems, and in particular, to an audio frame loss recovery method and apparatus.

BACKGROUND OF THE DISCLOSURE

An audio frame (also generally referred to as an information coded/encoded frame, an audio data frame, and the like) includes data obtained after segmenting an audio signal and encoding audio samples in each segment of the audio signal based on an audio encoding scheme. The data format and size of an audio frame are specified by a particular audio encoder. Segmenting an audio signal into frames may facilitate transmission and processing of an audio data stream. Therefore, audio frames are widely applied in services such as a network streaming media service and a Voice over Internet Protocol (VoIP) service. To ensure real time quality of audio transmission, an audio frame is usually transmitted using a User Datagram Protocol (UDP) designed for transmission over unreliable channels.

SUMMARY

This disclosure provides an audio frame loss recovery method and apparatus, to perform high-quality recovery on data of a lost audio frame with reduced bandwidth overhead.

In one implementation, an audio frame loss recovery method is disclosed. The method includes:

receiving a plurality of audio frames and at least one redundant frame, the plurality of audio frames including at least one first audio frame and a plurality of second audio frames, the redundant frame including data extracted from the plurality of second audio frames and not including data of the at least one first audio frame;

detecting a lost audio frame; and obtaining, when the redundant frame includes data of the lost frame, the data of the lost audio frame from the redundant frame, and recovering the lost audio frame by using the data of the lost audio frame; and obtaining, when the plurality of audio frames and the redundant frame include data of a neighboring audio frame of the lost audio frame, the data of the neighboring audio frame from the plurality of audio frames and the redundant frame, and recovering the lost audio frame by using the data of the neighboring audio frame.

In another implementation, an audio frame encoding method is further disclosed. The method includes:

encoding an audio signal to generate a plurality of audio data frames;

determining at least one first audio frame in the plurality of audio frames as an audio frame not provided with redundant data;

generating at least one redundant frame by using data of a plurality of second audio frames in the plurality of audio frames, the second audio frame being an audio frame in the plurality of audio frames other than the first audio frame; and sending the plurality of audio frames and the at least one redundant frame to a decoding device.

In another implementation, an audio frame loss recovery apparatus is disclosed. The apparatus includes a processor and a memory, the memory storing computer-readable instructions to cause the processor to:

receive a plurality of audio frames and at least one redundant frame, the plurality of audio frames including at least one first audio frame and a plurality of second audio frames, the redundant frame including data extracted from the plurality of second audio frames and not including data of the at least one first audio frame;

detect a lost audio frame; and obtain, when the redundant frame includes data of the lost audio frame, the data of the lost audio frame from the redundant frame, and recover the lost audio frame by using the data of the lost audio frame; or obtain, when the plurality of audio frames and the redundant frame include data of a neighboring audio frame of the lost audio frame, the data of the neighboring audio frame from the plurality of audio frames and the redundant frame, and recover the lost audio frame by using the data of the neighboring audio frame.

In another implementation, an audio encoding apparatus is further disclosed. The apparatus includes a processor and a memory, the memory storing computer-readable instructions to cause the processor to:

encode an audio signal to generate a plurality of audio data frames;

determine at least one first audio frame in the plurality of audio frames as an audio frame not provided with redundant data;

generate at least one redundant frame by using data of a plurality of second audio frames in the plurality of audio frames, the second audio frame being an audio frame in the plurality of audio frames other than the first audio frame; and send the plurality of audio frames and the at least one redundant frame to a decoding device.

In another implementation, a non-transitory computer-readable storage medium is disclosed for storing computer-readable instructions, and the computer executable instructions, when executed by a processor, cause the processor to:

receive a plurality of audio frames and at least one redundant frame, the plurality of audio frames including at least one first audio frame and a plurality of second audio frames, the redundant frame including data extracted from the plurality of second audio frames and not including data of the at least one first audio frame;

determine a lost audio frame;

obtain, when the redundant frame includes data of the lost audio frame, the data of the lost audio frame from the redundant frame, and recover the lost audio frame by using the data of the lost audio frame; or obtain, when the plurality of audio frames and the redundant frame include data of a neighboring audio frame of the lost audio frame, the data of the neighboring audio frame from the plurality of audio frames and the redundant frame, and recover the lost audio frame by using the data of the neighboring audio frame.

In another implementation, a non-transitory computer-readable storage medium is disclosed for storing computer-readable instructions, and the computer executable instructions, when executed by a processor, cause the processor to:

encode an audio signal to generate a plurality of audio data frames;

determine at least one first audio frame in the plurality of audio frames as an audio frame not provided with redundant data;

generate at least one redundant frame by using data of a plurality of second audio frames in the plurality of audio frames, the second audio frame being an audio frame in the plurality of audio frames other than the first audio frame; and send the plurality of audio frames and the at least one redundant frame to a decoding device.

In the implementations above, only coded information of some frames is used as redundant information, so that a data volume of the required redundant information is reduced, and the transmission efficiency of audio data is improved. In addition, not only the redundant frame but also the neighboring frame of the lost frame is used to recover the lost frame. The lost frame recovery can be achieved with high recovery rate while using less redundant information, reducing choppiness in audio streaming applications.

DESCRIPTION OF EMBODIMENTS

To clarify the technical problems to be resolved, technical solutions to these problems, and benefits of the embodiments of this disclosure, the following disclosure further describes various implementations in detail with reference to the accompanying drawings. It should be understood that the specific embodiments described herein are merely used as examples to explain this disclosure and are not intended as limitations.

Figure 5A:
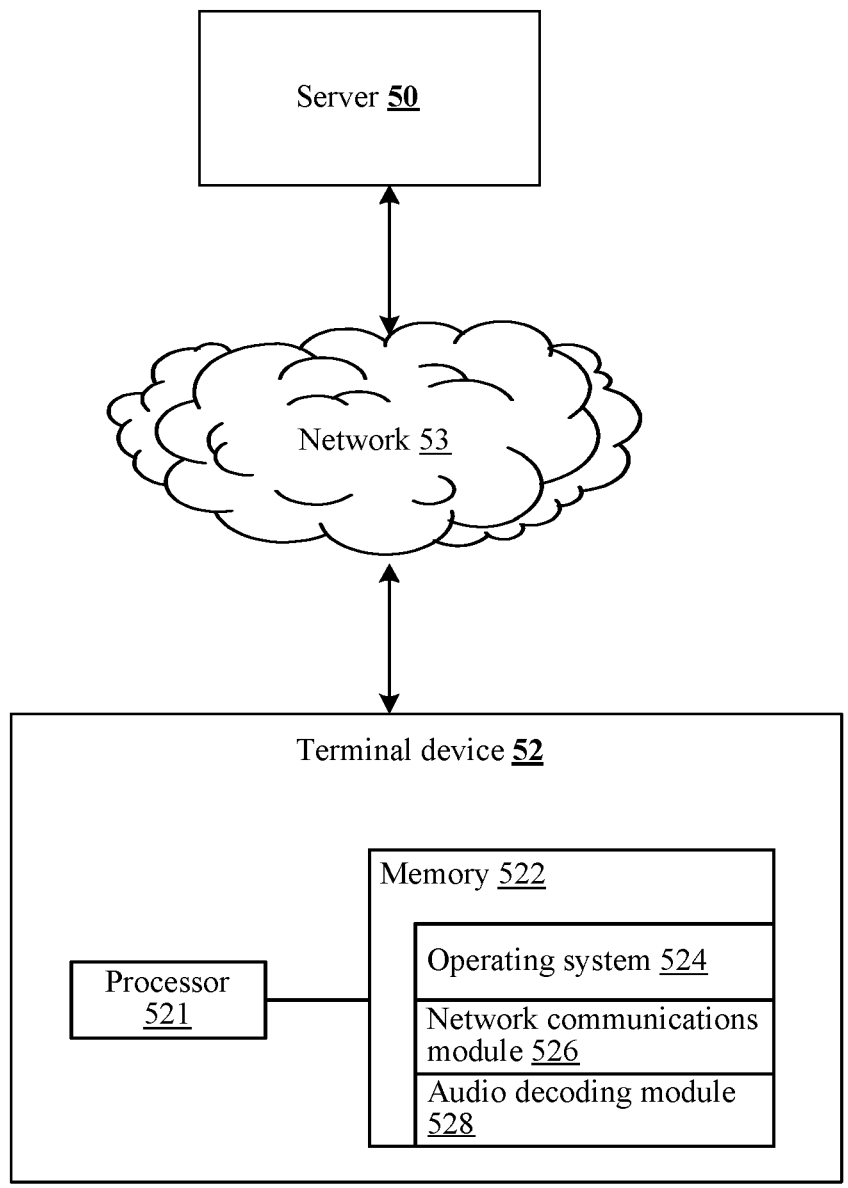
FIG. 5a and FIG. 5b show schematic diagrams of an audio transmission system.

FIG. 5a is a schematic diagram of an audio transmission system according to an embodiment of this disclosure. As shown in FIG. 5a, the system includes a server 50, a terminal device 52, and a network 53.

The server 50 is configured to provide an audio frame to the terminal device 52 through the network 53.

The terminal device 52 performs audio decoding on the received audio frame, and outputs an audio signal obtained through decoding. The terminal device 52 may include a processor 521 and a memory 522. The memory 522 stores an operating system 524, a network communications module 526 configured to receive and transmit data through the network, and an audio decoding module 528. The audio decoding module 528 may be stored in the memory 522 in a form of computer-executable instructions. In another embodiment, the audio decoding module 528 may alternatively be implemented in form of hardware or a combination of hardware and software.

Figure 6:
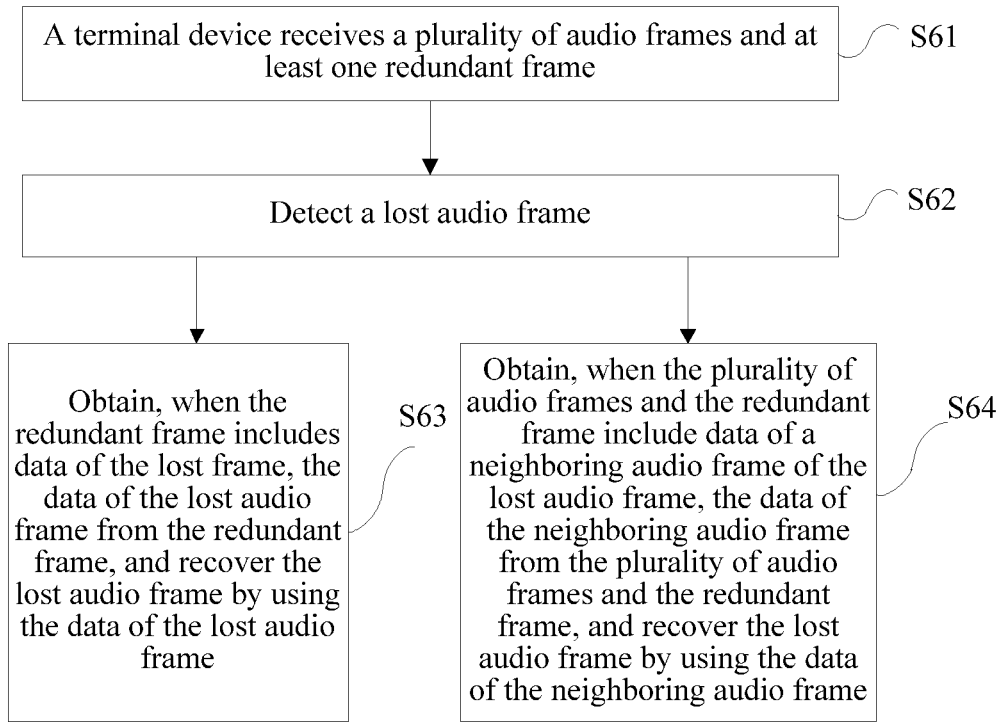
FIG. 6 shows a flowchart of an audio frame loss recovery method.

The terminal device 52 may perform an audio frame loss recovery method in the embodiments of this disclosure to decode audio data from the server 50. FIG. 6 is a flowchart of an audio frame loss recovery method according to an embodiment of this disclosure. As shown in FIG. 6, the method may include the following steps.

In Step S61, the terminal device receives a plurality of audio frames and at least one redundant frame.

The plurality of audio frames include at least one first audio frame and a plurality of second audio frames. The redundant frame includes data extracted from the plurality of second audio frames and does not include data of the at least one first audio frame. That is, the redundant frame is generated by using the data of the plurality of second audio frames only, and does not provide redundant data for the first audio frame.

In Step S62, the terminal device detects a lost audio frame.

In step S63, the terminal device obtains, when the redundant frame includes data of the lost frame, the data of the lost audio frame from the redundant frame, and recovers the lost audio frame by using the data of the lost audio frame contained in the redundant frame.

In step S64, the terminal device obtains, when the plurality of audio frames and the redundant frame include data of a neighboring audio frame of the lost audio frame, the data of the neighboring audio frame from the plurality of audio frames and the redundant frame, and recovers the lost audio frame by using the data of the neighboring audio frame of the lost audio frame.

In this way, only coded information of some (not all) historical frames of a current frame is used as redundant information in the redundant frame, so that a data volume of the required redundant information is reduced, and the transmission efficiency of audio data is improved. In addition, not only the information contained in the redundant frame, but also a neighboring frame of the lost frame may be additionally used to recover the lost frame. Therefore, more effective lost frame recovery may be achieved by using less redundant information, reducing the amount of pausing or transmission choppiness due to data packet loss in audio streaming.

In some exemplary implementations, at most two first audio frames (the frames having no information in the redundant frame) that are consecutive are selected between two sets of neighboring second audio frames (the audio frames with information included in the redundant frame) in the received plurality of audio frames, where each set of neighboring second audio frames include at least one audio frame. That is, at most two consecutive frames (first frames) at an interval of every at least one audio frame (these audio frames being referred to as second audio frames) do not provide data to the redundant frame. In this way, the location and quantity of the first audio frames are designed and determined such that the probability that a lost frame cannot be recovered is reduced and a reasonable lost frame recovery rate can be achieved while using less redundant data.

In some exemplary implementations, the neighboring audio frame of a lost frame includes a previous (e.g., an immediately preceding) frame and/or a next (e.g., an immediately next) frame of the lost audio frame, and the recovering the lost audio frame by using the data of the neighboring audio frame includes:

setting a value of an encoding parameter of the lost audio frame to a value between a value of the encoding parameter of the previous frame and a value of the encoding parameter of the next frame.

In some examples, the encoding parameter is at least one of a line spectral pair, a pitch period, and a gain.

In some examples, the neighboring audio frame is a previous frame or a next frame of the lost audio frame, and the recovering the lost audio frame by using the data of the neighboring audio frame includes: setting a value of an encoding parameter of the lost audio frame to a value of the encoding parameter of the neighboring audio frame or a preset value.

Figure 5B:
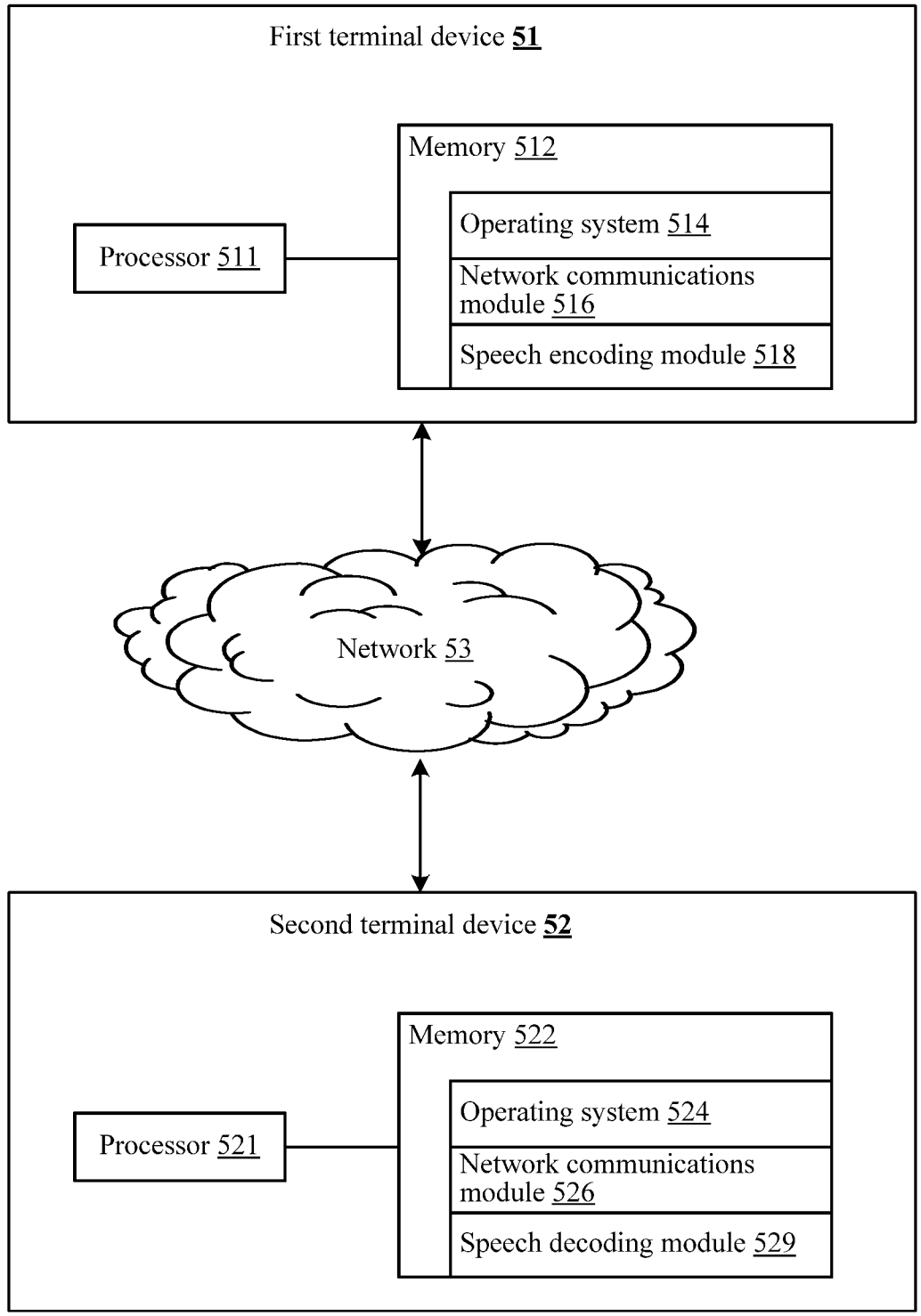

FIG. 5b is a schematic diagram of an audio transmission system according to another embodiment of this disclosure. The system may be applied to a network voice communications service, for example, an instant messaging service or a VoIP service. As shown in FIG. 5b, the system includes a first terminal device 51, a second terminal device 52, and a network 53.

The first terminal device 51 may collect a speech signal entered by a user, encodes the collected speech signal to obtain a speech frame, and sends the speech frame to the second terminal device 52.

The second terminal device 52 may perform an audio frame loss recovery method of the embodiments of this disclosure to decode speech data from the first terminal device 51. The second terminal device 52 is similar to the terminal device 52 in the embodiment shown in FIG. 5a. However, in some implementations, the audio decoding module 528 in FIG. 5a is presented as a speech decoding module 529.

Figure 7:
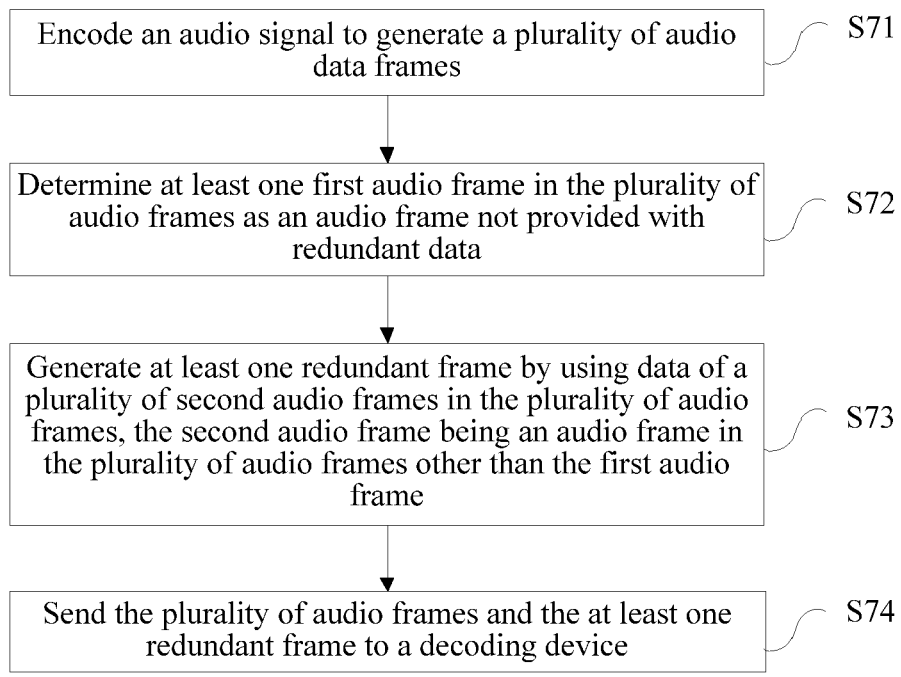
FIG. 7 shows a flowchart of an audio encoding method.

FIG. 7 is a flowchart of an audio encoding method according to an embodiment of this disclosure. The audio encoding method may be performed by the first terminal device 51. As shown in FIG. 7, the method may include the following steps.

In Step S71, the first terminal device 51 encodes an audio signal to generate a plurality of audio data frames.

In Step S72, the first terminal device determines at least one first audio frame in the plurality of audio frames as an audio frame not provided with redundant data.

In Step S73, the first terminal device generates at least one redundant frame by using data of a plurality of second audio frames in the plurality of audio frames, the second audio frame being an audio frame in the plurality of audio frames other than the first audio frame.

In Step S74, the first terminal device sends the plurality of audio frames and the at least one redundant frame to a decoding device.

In this way, on an audio encoding end, the redundant data is provided for some audio frames (rather than all audio frames) only, so that a data volume of the redundant data can be reduced, and the transmission efficiency of audio data can be improved.

In some implementations, at least one audio frame may be selected from the plurality of audio frames as the first audio frame by selecting at most two consecutive frames at an interval of every at least one audio frame. That is, at most two consecutive frames are selected as first audio frames (the first audio frames do not participate in determining the redundant from) at an interval of every at least one audio frame (these audio frames being referred to as second audio frames). In this way, the location and quantity of the first audio frames are controlled, so as to reduce the probability that a lost frame is not recoverable, and increase loss recovery rate using little redundant data.

Figure 1:
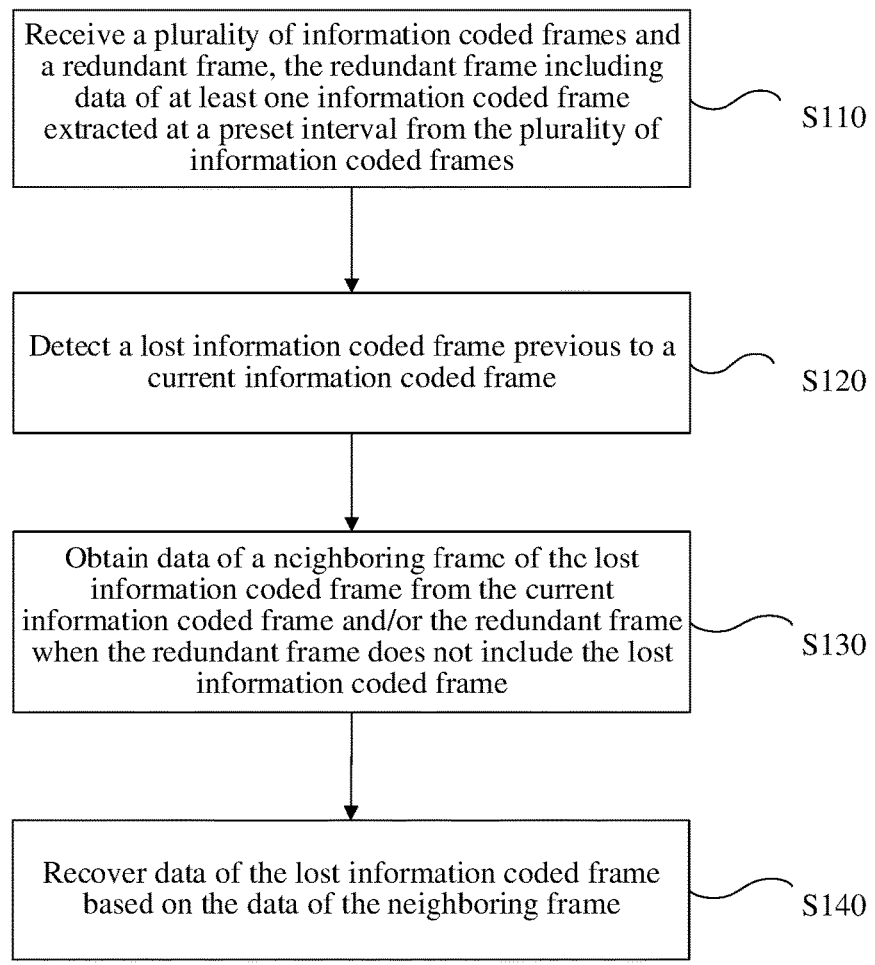
FIG. 1 shows a flowchart of an audio frame loss recovery method.

FIG. 1 is a flowchart of an audio frame loss recovery method according to an embodiment of this disclosure. The technical solution in some implementations may be implemented in any terminal or server. The terminal may be a mobile terminal, for example, a mobile phone or a tablet computer. The technical solution in some implementations may be used to recover audio data, video data, or the like transmitted in real time on a client device or a data relay server in a wide range of applications. The method in some implementations may include the following steps.

In Step S110, an electronic device may receive a plurality of audio frames and a redundant frame, the redundant frame including data of at least one audio frame extracted at a preset interval from the plurality of audio frames.

In some implementations, the audio frame may include a streaming audio data or another type of data. This is not limited in some implementations. In some implementations, the preset interval is not limited, and may be specifically an interval of one or more frames.

In some implementations, the preset interval may be one frame or two frames. In this way, for a lost frame, at least data for one of its neighboring frame may be found from the redundant frame, so that reasonable recovery of such a lost frame may be achieved using at least one of its neighboring frames.

In some implementations, when sending data, a transmitting end of the audio data may cache streaming audio data of a plurality of historical frames ahead of a current frame, and extract, at a frame interval, a bitstream of a corresponding historical frame as the redundant frame. In some implementations, audio frames are not be extracted consecutively for obtaining the redundant frame but are obtained at an interval. Therefore, the amount of data used for the redundant frame is reduced, so that additional bandwidth needed to transmit the redundant frames is effectively reduced.

In Step S120, the electronic device detects a lost audio frame previous to a current audio frame.

In some implementations in an exemplary social network application, a server or relaying server of the social network or a client application installed on a terminal device may determine, based on a received current audio frame, preceding lost audio frames, e.g., one or two lost frames preceding the current frame.

In Step S130, the device obtains data of a neighboring frame of the lost audio frame from the current audio frame and/or the redundant frame when the redundant frame does not include data of the lost audio frame.

In some implementations, when the redundant frame includes data of the lost audio frame, the data may be directly used for recovery. When the redundant frame does not include the data of the lost audio frame, the neighboring frame of the lost frame may be obtained. The data of the neighboring frame may be located in the redundant frame or in the current audio frame. In some implementations, the redundant frame may be decoded by using a decoder to obtain decoded information, so as to generate a recovery packet (that is, recovery data) either because the redundant frame contains data for the lost frame or the redundant frame contains data of a neighboring frame of the lost frame.

In Step S140, the electronic device recovers data of the lost audio frame based on the data of the neighboring frame of the lost frame. In some implementations, data of the redundant frame or the current frame corresponding to the lost frame may be decoded by using a decoder, to recover the lost frame.

In some implementations of speech transmission in a social network, the speech may have short-time correlation and stability. Therefore, a lost frame may be relatively well recovered based on data of spaced audio frames in redundant frames. The technical solution above thus takes into consideration both the network bandwidth usage by redundant frame and lost frame recoverability with relatively small amount of data, aiming at improving network transmission efficiency (reducing network burden) while ensuring lost frame recoverability.

In another implementation of this disclosure, another audio frame loss recovery method is provided. In this method, step S140 above may include:

calculating the $i^{th}$ line spectral pair, pitch period, or gain in the lost audio frame based on a preset first coefficient, the $i^{th}$ line spectral pair, pitch period, or gain in a previous frame of the lost frame, and the $i^{th}$ line spectral pair, pitch period, or gain in a next frame of the lost frame, where i is a positive integer.

In some implementations, the first coefficient is not limited to a single preset value. Rather, it may include two preset values respectively corresponding to the previous frame and the next frame of the lost frame.

Taking a commonly used voice encoding/decoding model, e.g., a code-excited linear prediction (CELP) model, as an example, four groups of compressed encoding parameters including an LSP (line spectral pair), a Pitch (pitch period), a Gain (gain), and a Code (codebook), and representing a frame of speech signal for a neighboring frame of the lost frame may be obtained by parsing and decoding bitstreams of the current coded frame and/or the redundant frame.

In some implementations, an "interpolation" recovery method may be used. For example, the $i^{th}$ LSP/Pitch/Gain parameter of the to-be-recovered $n^{th}$ lost frame is obtained by using the following interpolation process:

First, the bitstreams of the current encoded frame and the redundant frame are parsed to obtain the line spectral pair (LSP), Pitch (pitch period), Gain (gain), and Code (codebook) parameters.

LSP_int(i)(n)=a×LSP(i)(n+1)+(1−a)×LSP(i)(n−1), where n is a frame sequence number, a is a weighting coefficient less than 1, and i is an LSP sequence number;

Pitch_int(n)=0.5×(Pitch(n+1)+Pitch(n−1)), where n is a frame sequence number; and Gain_int(i)(n)=b×Gain(i)(n+1)+(1−b)×Gain(i)(n−1), where n is a frame sequence number, b is a weighting coefficient less than 1, and i is a Gain sequence number.

In some implementations, values for the coefficients a and b are not limited by the example above, and they may be replaced with other values. The lost frame may be recovered with high fidelity based on data of the previous frame and the next frame.

In another implementation of this disclosure, another audio frame loss recovery method is provided. In this method, step S140 above may include:

calculating the $i^{th}$ line spectral pair or gain of the lost audio frame based on a preset second coefficient and the $i^{th}$ line spectral pair or gain in a previous frame of the lost frame; and selecting larger of a preset smallest allowed value of a pitch period and a relatively large value of the $i^{th}$ pitch period in the previous frame as the $i^{th}$ pitch period of the lost audio frame, where i is a positive integer.

In this implementation, the second coefficient can be any predetermined value within a range and is not limited to any specific preset value.

As such, an "extrapolation" recovery method is used in the implementations above. The $i^{th}$ LSP/Pitch/Gain parameter of the to-be-recovered $n^{th}$ lost frame is obtained by using the following extension manner:

LSP_ext(i)(n)=LSP(i)(n−1), where n is a frame sequence number, and i is an LSP sequence number;

Pitch_ext(n)=Max($T_{low}$, Pitch(n−1)−1), where n is a frame sequence number, and $T_{low}$ is the smallest allowed value of the pitch period; and Gain_ext(i)(n)=c×Gain(i)(n−1), where n is a frame sequence number, c is a weighting coefficient less than 1, and i is a gain sequence number.

In some implementations, the second coefficient during LSP recovery may be 1 (see the LSP expression above) or may be another value. The value for the second coefficient for LSP is not limited by this disclosure. When there are relatively many lost frames, they may be effectively recovered based on the previous frames.

Based on the foregoing implementation, step S140 may further include: selecting random values as a codebooks for the lost frame. In some implementations, the $i^{th}$ Code (codebook) parameter of the $n^{th}$ lost frame is obtained by using a random value manner:

Code_comp(i)(n)=Random( ).

In the implementation above, random values are selected for the codebooks, providing a simple and fast scheme.

Figure 2:
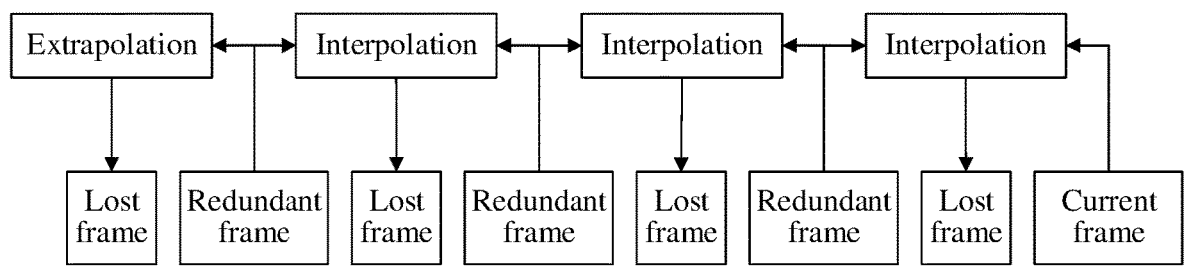
FIG. 2 shows a schematic logic diagram of an audio frame loss recovery method.

In the foregoing embodiments, two recovery manners of interpolation and extrapolation are described. A schematic diagram of recovery is shown in FIG. 2. That is, two neighboring frames may be provided in the current frame and the redundant frame for interpolation recovery, and one neighboring frame may be provided for extrapolation recovery.

Figure 3:
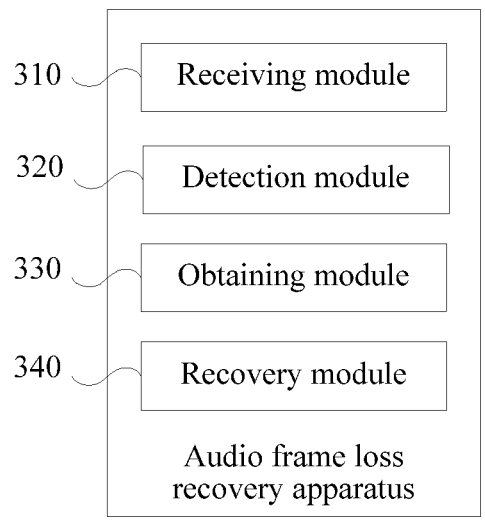
FIG. 3 shows a block diagram of an audio frame loss recovery apparatus.

As shown in FIG. 3, an embodiment of this disclosure provides an audio frame loss recovery apparatus. This technical solution may be implemented in any terminal or server. The terminal may be a mobile terminal, for example, a mobile phone or a tablet computer. This technical solution may be used to recover audio data, video data, or the like that is transmitted in real time on a client or a server of a social network. The apparatus may include: a receiving module 310, a detection module 320, an obtaining module 330, and a recovery module 340.

The receiving module 310 is configured to receive a plurality of audio frames and a redundant frame, the redundant frame including data of at least one audio frame extracted at a preset interval from the plurality of audio frames. In some implementations, the audio frame may include an audio bitstream data or another type of data. In some implementations, the preset interval may be specifically an interval of one or more frames. In other implementations, the preset interval may be other number of frames.

In some implementations, the preset interval may be one frame or two frames. In this way, for a lost frame, at least one neighboring frame may be found from the redundant frame, so as to perform data recovery, and data of the neighboring frame can provide a relatively good recovery.

In some implementations, when sending data, a transmit end of the audio data caches audio bitstream data of a plurality of historical frames preceding a current frame, and extracts, at a frame interval, a bitstream of a corresponding historical frame as the redundant frame. In some implementations, audio frames are obtained at an interval to generate the redundant frame. Therefore, the size of the redundant frame is reduced, so that bandwidth requirement is reduced for transmitting the redundant frame.

The detection module 320 is configured to detect a lost audio frame previous to a current audio frame.

Using a social network as an example, a server of the social network or a client installed on a terminal may determine, based on a received current audio frame, preceding lost audio frames, for example, one or two preceding lost frames of the current frame.

The obtaining module 330 is configured to obtain data of a neighboring frame of the lost audio frame from the current audio frame and/or the redundant frame when the redundant frame does not include the lost audio frame.

In some implementations, when the redundant frame includes data of the lost audio frame, the data may be directly used for recovery. When the redundant frame does not include the data of the lost audio frame, the neighboring frames of the lost frame may be obtained. The data of the neighboring frames may be located in the redundant frame or the current audio frame. In some implementations, the redundant frame may be decoded by using a decoder to obtain decoded information, so as to generate a recovery frame.

The recovery module 340 is configured to recover data of the lost audio frame based on the data of the neighboring frame. In some implementations, data of the redundant frame or the current frame corresponding to the lost frame may be decoded by using a decoder, to recover the lost frame.

In some implementations of speech transmission in a social network, the speech has short-time correlation and stability. Therefore, a lost frame can be relatively well recovered based on data of spaced audio frames in redundant frames. The technical solution above thus takes into consideration both the network bandwidth usage by redundant frame and lost frame recoverability with relatively small amount of data, aiming at improving network transmission efficiency (reducing network burden) while ensuring lost frame recoverability.

Another implementation of this disclosure provides another audio frame loss recovery apparatus. In this implementation, the recovery module 340 may calculate the $i^{th}$ line spectral pair, pitch period, or gain in the lost audio frame based on a preset first coefficient, the $i^{th}$ line spectral pair, pitch period, or gain in a previous frame, and the $i^{th}$ line spectral pair, pitch period, or gain in a next frame, wherein i is a positive integer.

In some implementations, the first coefficient is not limited a single preset value. Rather, it may include two values respectively corresponding to the previous frame and the next frame of the last frame.

Taking a commonly used voice coding/decoding model, e.g., a code-excited linear prediction (CELP) coding model, as an example, four groups of compression coding parameters including an LSP (line spectral pair), a Pitch (pitch period), a Gain (gain), and a Code (codebook), and representing a frame of speech signal for a neighboring frame of the lost frame may be obtained by parsing bitstreams of the current coded frame and/or the redundant frame.

In some implementation, an "interpolation" recovery method is used. For example, the $i^{th}$ LSP/Pitch/Gain parameter of the to-be-recovered $n^{th}$ lost frame is obtained by using the following interpolation process:

First, the bitstreams of the current coded frame and the redundant frame are parsed to obtain the line spectral pair (LSP), Pitch (pitch period), Gain (gain), and Code (codebook) parameters.

LSP_int(i)(n)=a×LSP(i)(n+1)+(1−a)×LSP(i)(n−1), where n is a frame sequence number, a is a weighting coefficient less than 1, and i is an LSP sequence number;

Pitch_int(n)=0.5×(Pitch(n+1)+Pitch(n−1)), where n is a frame sequence number; and Gain_int(i)(n)=b×Gain(i)(n+1)+(1−b)×Gain(i)(n−1), where n is a frame sequence number, b is a weighting coefficient less than 1, and i is a Gain sequence number.

In some implementations, values of the coefficients a and b are not limited by the example above, and they may be replaced with another values. The lost frame may be recovered with high fidelity based on data of the previous frame and the next frame.

An embodiment of this disclosure provides another audio frame loss recovery apparatus. In particular, the recovery module 340 may calculate the $i^{th}$ line spectral pair or gain of the lost audio frame based on a preset second coefficient and the $i^{th}$ line spectral pair or gain in a previous frame of the last frame, and select greater of a preset smallest allowed value of a pitch period and a relatively large value of the $i^{th}$ pitch period in the previous frame as the $i^{th}$ pitch period of the lost audio frame, where i is a positive integer.

In this implementation, the second coefficient can be any predetermined value within a range and is not limited to any specific preset value.

As such, an "extrapolation" recovery method is used in the implemented above. The $i^{th}$ LSP/Pitch/Gain parameter of the to-be-recovered $n^{th}$ lost frame is obtained by using the following extension manner:

LSP_ext(i)(n)=LSP(i)(n−1), where n is a frame sequence number, and i is an LSP sequence number;

Pitch_ext(n)=Max($T_{low}$, Pitch(n−1)−1), where n is a frame sequence number, and $T_{low}$ is the smallest allowed value of the pitch period; and Gain_ext(i)(n)=c×Gain(i)(n−1), where n is a frame sequence number, c is a weighting coefficient less than 1, and i is a gain sequence number.

In some implementations, the second coefficient during LSP recovery may be 1 (see the LSP expression above) or may be another value. The value for the second coefficient for LSP is not limited by this disclosure. When there are relatively many lost frames, they may be effectively recovered based on the previous frames.

Based on the foregoing embodiment, further, the recovery module 340 selects a random values as codebooks for the lost frame. In some implementations, the $i^{th}$ Code (codebook) parameter of the $n^{th}$ lost frame is obtained by using a random value manner:

Code_comp(i)(n)=Random( ).

In the implementation above, random values are selected for the codebooks, providing a simple and fast scheme.

In the foregoing embodiments, two recovery manners of interpolation and extrapolation are described. A schematic diagram of recovery is shown in FIG. 2. That is, two neighboring frames may be provided in the current frame and the redundant frame for interpolation recovery, and one neighboring frame may be provided for extrapolation recovery.

Figure 4:
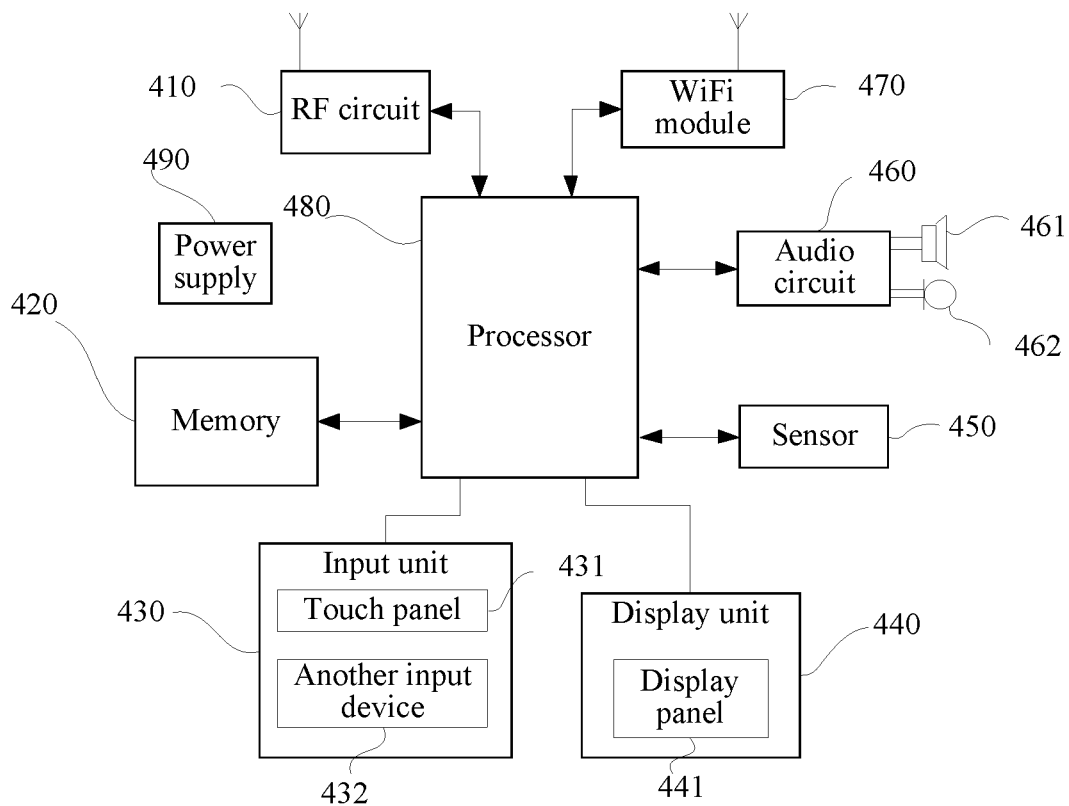
FIG. 4 shows a schematic diagram of a terminal device for implementing audio frame loss recovery.

An embodiment of this disclosure further provides another terminal configured to implement the audio frame loss recovery apparatus in the embodiments of this disclosure, as shown in FIG. 4. For ease of description, only components related to the embodiments of this disclosure is shown. For a specific technical detail not disclosed, refer to the method embodiments of this disclosure. The terminal may be any terminal device including a mobile phone, a tablet computer, a Personal Digital Assistant (PDA), a Point of Sales (POS), and a vehicle-mounted computer. FIG. 4 shows an mobile phone as an example. In particular, FIG. 4 is a partial block diagram of a mobile phone that can be used to implement the method described in this disclosure. Referring to FIG. 4, the mobile phone includes components such as a radio frequency (RF) circuit 410, a memory 420, an input unit 430, a display unit 440, a sensor 450, an audio circuit 460, a Wireless Fidelity (WiFi) module 470, a processor 480, and a power supply 490. A person of ordinary skill in the art may understand that the structure of the mobile phone shown in FIG. 4 is merely exemplary and does not constitute any limitation, and the mobile phone may include more components or fewer components than those shown in the figure. Some components shown may be combined, or a different component may be used.

The memory 420 may be configured to store a software program and module. The processor 480 runs the software program and module stored in the memory 420, to implement various functions of the mobile phone. The memory 420 may mainly include a program storage area and a data storage area. The program storage area may store an operating system, application programs required by at least one function (such as a sound playback function and an image display function), and the like. The data storage area may store data (such as audio data and an address book) created according to use of the mobile phone, and the like. In addition, the memory 420 may include a high speed random access memory, and may further include a non-volatile memory, such as at least one magnetic disk storage device, a flash memory, or other volatile solid-state storage devices.

The processor 880 is the control center of the mobile phone, and is connected to various parts of the mobile phone by using various interfaces and busses. By running or executing the software program and/or module stored in the memory 420, and invoking data stored in the memory 420, the processor 880 performs various functions of the mobile phone and processes data, thereby performing overall monitoring on the mobile phone.

In some implementations of this disclosure, the processor 480 included in the terminal further provides the following function: executing computer-readable instructions in the memory 420 to:

receive a plurality of audio frames and a redundant frame, the redundant frame including data of at least one audio frame extracted at a preset interval from the plurality of audio frames;

detect a lost audio frame previous to a current audio frame;

obtain data of a neighboring frame of the lost audio frame from the current audio frame and the redundant frame when the redundant frame does not include the lost audio frame; and recover data of the lost audio frame based on the data of the neighboring frame.

This disclosure thus provides various implementation of an audio frame loss recovery. Encoded information of some frames is used as redundant information, and redundant information may be reduced by more than half by only selecting information of some (not all) frames to be included in the redundant information. For audio frames containing speech which has short-time correlation and stability, a lost frame can be relatively well recovered based on data of spaced speech audio frames in redundant frames. As such, the implementation of this disclosure provides reduced bandwidth for transmitting redundant frames while achieving relatively good lost frame recovery capability.

The foregoing describes exemplary implementations of this disclosure with reference to the accompanying drawings. The scope of this disclosure is not limited by these implementations. A person of ordinary skill in the art may make various variations to these implementations without departing from the spirit of this disclosure. For example, a feature of one embodiment may be combined with another embodiment to obtain still another embodiment. Any modification, equivalent replacement, and improvement made by using the technical concept of this disclosure should fall within the scope of this disclosure.

What is claimed is:

1. An audio frame loss recovery method, performed by a terminal device having a memory for storing instructions and a processor for executing the instructions, the method comprising:

receiving a plurality of audio frames and at least one redundant frame, wherein the plurality of audio frames comprise at least one first audio frame and a plurality of second audio frames, and the redundant frame comprises data extracted from the plurality of second audio frames only and without data from the at least one first audio frame;

detecting a lost audio frame;

determining whether the redundant frame includes data from the lost audio frame;

in response to the redundant frame including data of the lost audio frame, obtaining the data of the lost audio frame from the redundant frame, and recovering the lost audio frame based on the data of the lost audio frame contained in the redundant frame; and in response to the plurality of audio frames and the redundant frame comprising data of at least one neighboring audio frame of the lost audio frame, obtaining the data of the at least one neighboring audio frame of the lost audio frame from the plurality of audio frames and the redundant frame, and recovering the lost audio frame based on the data of the at least one neighboring audio frame by:

determining an $i^{th}$ line spectral pair of the lost audio frame as the $i^{th}$ line spectral pair of the at least one neighboring audio frames according to $LSP_i(n)=a*LSP_i(n+1)+(1-a)*LSP_i(n-1)$, wherein the $LSP_i(n)$, $LSP_i(n-1)$, and $LSP_i(n+1)$ represent the $i^{th}$ line spectral pair of the lost audio frame, its preceding and following neighboring audio frames, respectively, and wherein a is a weighting coefficient less than 1;

determining an $i^{th}$ gain of the lost audio frame from the $i^{th}$ gain of the at least one neighboring audio frames with a predetermined scaling factor; and selecting a larger of a preset smallest allowed value of pitch period and an $i^{th}$ pitch period of the at least one neighboring audio frames as an $i^{th}$ pitch period of the lost audio frame such that when the $i^{th}$ pitch period of the at least one neighboring audio frames is smaller than the preset smallest allowed value of pitch period, the preset smallest allowed value is set as the an $i^{th}$ pitch period of the lost audio frame, wherein i is a positive integer.

2. The method according to claim 1, wherein the at least one first audio frame contains no more than two consecutive audio frames from the plurality of audio frames.

3. The method according to claim 1, wherein the at least one neighboring audio frame of the lost audio frame comprises an immediately preceding frame and an immediately next frame of the lost audio frame, and recovering the lost audio frame based on the data of the at least one neighboring audio frame comprises:

setting an encoding parameter of the lost audio frame to a value between a value of a corresponding encoding parameter of the immediately preceding frame and a value of a corresponding encoding parameter of the immediately next frame.

4. The method according to claim 3, wherein the encoding parameter is at least one of a line spectral pair, a pitch period, and a gain.

5. The method according to claim 3, wherein setting the encoding parameter of the lost audio frame to the value between the value of the encoding parameter of the immediately preceding frame and the value of the encoding parameter of the immediately next frame comprises:
  determining the pitch period of the lost audio frame based on an average of pitch periods of the immediately preceding frame and the immediately next frame; and
  determining the $i^{th}$ gain in the lost audio frame based on a second sum of the $i^{th}$ gains in the immediately preceding frame and the immediately next frame with a second predetermined weight.

6. The method according to claim 1, wherein the at least one neighboring audio frame comprises a single neighboring audio frame including an immediately preceding frame or an immediately next frame of the lost audio frame, and recovering the lost audio frame based on the data of the at least one neighboring audio frames comprises:
  setting an encoding parameter of the lost audio frame according to a value of a corresponding encoding parameter of the single neighboring audio frame or a preset value.

7. The method according to claim 1, wherein recovering the lost audio frame based on the data of the at least one neighboring audio frame comprises:
  selecting a random value as a codebook for the lost audio frame.

8. An audio frame loss recovery apparatus, comprising a memory for storing instruction and a processor in communication with the memory, wherein the processor, when executing the instructions, is configured to:
  receive a plurality of audio frames and at least one redundant frame, wherein the plurality of audio frames comprise at least one first audio frame and a plurality of second audio frames, and the redundant frame comprises data extracted from the plurality of second audio frames only and without data from the at least one first audio frame;
  detect a lost audio frame;
  determine whether the redundant frame includes data from the lost audio frame;
  in response to the redundant frame including data of the lost audio frame, obtain the data of the lost audio frame from the redundant frame, and recover the lost audio frame based on the data of the lost audio frame contained in the redundant frame; and
  in response to the plurality of audio frames and the redundant frame comprising data of at least one neighboring audio frame of the lost audio frame, obtain the data of the at least one neighboring audio frame of the lost audio frame from the redundant frame, and recover the lost audio frame based on the data of the at least one neighboring audio frame by:
    determining an $i^{th}$ line spectral pair of the lost audio frame as the $i^{th}$ line spectral pair of the at least one neighboring audio frames according to $LSP_i(n)=a*LSP_i(n+1)+(1-a)*LSP_i(n-1)$, wherein the $LSP_i(n)$, $LSP_i(n-1)$, and $LSP_i(n+1)$ represent the $i^{th}$ line spectral pair of the lost audio frame, its preceding and following neighboring audio frames, respectively, and wherein a is a weighting coefficient less than 1;
    determining an $i^{th}$ gain of the lost audio frame from the $i^{th}$ gain of the at least one neighboring audio frames with a predetermined scaling factor; and
    selecting a larger of a preset smallest allowed value of pitch period and an $i^{th}$ pitch period of the at least one neighboring audio frames as an $i^{th}$ pitch period of the lost audio frame such that when the $i^{th}$ pitch period of the at least one neighboring audio frames is smaller than the preset smallest allowed value of pitch period, the preset smallest allowed value is set as the an $i^{th}$ pitch period of the lost audio frame,
  wherein i is a positive integer.

9. The apparatus according to claim 8, wherein the processor, when executing the instructions, is further configured to:
  obtain data of an immediately preceding frame and data of an immediately next frame of the lost audio frame from the redundant frame as the data of the at least one neighboring audio frame; and
  set an encoding parameter of the lost audio frame to a value between a value of a corresponding encoding parameter of the immediately preceding frame and a value of a corresponding encoding parameter of the immediately next frame.

10. The apparatus according to claim 8, wherein the single neighboring audio frame including an immediately preceding frame or an immediately next frame of the lost audio frame, and wherein the processor, when executing the instructions, is further configured to:
  obtain data of the single neighboring audio frame from the redundant frame as the data of the at least one neighboring audio frame; and
  set an encoding parameter of the lost audio frame according to a value of a corresponding encoding parameter of the single neighboring audio frame or a preset value.

11. The apparatus according to claim 8, wherein the processor, when executing the instructions, is further configured to:
  select a random value as a codebook for the lost audio frame.

12. A non-transitory computer medium for storing instructions, the instructions, when executed by a processor of a device, are configured to cause the device to:
  receive a plurality of audio frames and at least one redundant frame, wherein the plurality of audio frames comprise at least one first audio frame and a plurality of second audio frames, and the redundant frame comprises data extracted from the plurality of second audio frames only and without data from the at least one first audio frame;
  detect a lost audio frame;
  determine whether the redundant frame includes data from the lost audio frame;
  in response to the redundant frame including data of the lost audio frame, obtain the data of the lost audio frame from the redundant frame, and recover the lost audio frame based on the data of the lost audio frame contained in the redundant frame; and
  in response to the plurality of audio frames and the redundant frame comprising data of at least one neighboring audio frame of the lost audio frame, obtain the data of the at least one neighboring audio frame of the lost audio frame from the redundant frame, and recover the lost audio frame based on the data of the at least one neighboring audio frame by:
    determining an $i^{th}$ line spectral pair of the lost audio frame as the $i^{th}$ line spectral pair of the at least one neighboring audio frames according to $LSP_i(n) = a*LSP_i(n+1)+(1-a)*LSP_i(n-1)$, wherein the $LSP_i(n)$, $LSP_i(n-1)$, and $LSP_i(n+1)$ represent the $i^{th}$ line spectral pair of the lost audio frame, its preceding and following neighboring audio frames, respectively, and wherein a is a weighting coefficient less than 1;

determining an $i^{th}$ gain of the lost audio frame from the $i^{th}$ gain of the at least one neighboring audio frames with a predetermined scaling factor; and selecting a larger of a preset smallest allowed value of pitch period and an $i^{th}$ pitch period of the at least one neighboring audio frames as an $i^{th}$ pitch period of the lost audio frame such that when the $i^{th}$ pitch period of the at least one neighboring audio frames is smaller than the preset smallest allowed value of pitch period, the preset smallest allowed value is set as the an $i^{th}$ pitch period of the lost audio frame, wherein i is a positive integer.

13. The non-transitory computer medium of claim 12, wherein the at least one first audio frame contains no more than two consecutive audio frames from the plurality of audio frames.

14. The non-transitory computer medium of claim 12, wherein the at least one neighboring audio frame of the lost audio frame comprises an immediately preceding frame and an immediately next frame of the lost audio frame, and to recover the lost audio frame based on the data of the at least one neighboring audio frame comprises executing the instructions to cause the device to:

set an encoding parameter of the lost audio frame to a value between a value of a corresponding encoding parameter of the immediately preceding frame and a value of a corresponding encoding parameter of the immediately next frame.

15. The non-transitory computer medium of claim 14, wherein the encoding parameter is at least one of a line spectral pair, a pitch period, and a gain.

16. The non-transitory computer medium of claim 14, wherein to set the encoding parameter of the lost audio frame to the value between the value of the encoding parameter of the immediately preceding frame and the value of the encoding parameter of the immediately next frame, the instructions, when executed by the processor, cause the device to:

determine the pitch period of the lost audio frame based on an average of pitch periods of the immediately preceding frame and the immediately next frame; and determine the $i^{th}$ gain in the lost audio frame based on a second sum of the $i^{th}$ gains in the immediately preceding frame and the immediately next frame with a second predetermined weight.

17. The non-transitory computer medium of claim 12, wherein the at least one neighboring audio frame comprises a single neighboring audio frame including an immediately preceding frame or an immediately next frame of the lost audio frame, and to recover the lost audio frame based on the data of the at least one neighboring audio frames, the instructions, when executed by the processor, cause the device to:

set an encoding parameter of the lost audio frame according to a value of a corresponding encoding parameter of the single neighboring audio frame or a preset value.

18. The non-transitory computer medium of claim 12, to recover the lost audio frame based on the data of the at least one neighboring audio frames, the instructions, when executed by the processor, cause the device to select a random value as a codebook for the lost audio frame.

\* \* \* \* \*